United States Patent
Tsuruta et al.

(10) Patent No.: US 11,417,920 B2
(45) Date of Patent: Aug. 16, 2022

(54) POWER STORAGE DEVICE

(71) Applicant: TOYOTA JIDOSHA KABUSHIKI KAISHA, Toyota (JP)

(72) Inventors: Haruka Tsuruta, Toyota (JP); Takashi Murata, Kasugai (JP); Satoshi Kitagawa, Uji (JP); Masaki Hanada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 16/852,618

(22) Filed: Apr. 20, 2020

(65) Prior Publication Data

US 2020/0358149 A1 Nov. 12, 2020

(30) Foreign Application Priority Data

May 8, 2019 (JP) .............................. JP2019-088234

(51) Int. Cl.
*H01M 10/615* (2014.01)
*H01M 10/48* (2006.01)

(52) U.S. Cl.
CPC ....... *H01M 10/615* (2015.04); *H01M 10/486* (2013.01)

(58) Field of Classification Search
CPC ... H01M 10/60; H01M 10/615; H01M 10/486
See application file for complete search history.

(56) References Cited

U.S. PATENT DOCUMENTS

| | | | |
|---|---|---|---|
| 2008/0198897 A1 | 8/2008 | Suzuki et al. |
| 2018/0006345 A1 | 1/2018 | Murata et al. |
| 2018/0062223 A1 | 3/2018 | Murata et al. |

FOREIGN PATENT DOCUMENTS

| | | |
|---|---|---|
| JP | 2008-204708 A | 9/2008 |
| JP | 2018-006117 A | 1/2018 |
| JP | 2018-032548 A | 3/2018 |

*Primary Examiner* — James Lee
(74) *Attorney, Agent, or Firm* — Sughrue Mion, PLLC

(57) ABSTRACT

A power storage device includes at least one power storage cell, a heater that increases a temperature of the power storage cell, a pressing member that presses the heater against the power storage cell, and a sensor provided in the heater. The heater includes a base material and a heater wire provided on the base material. The base material includes a lead portion drawn from between the pressing member and the power storage cell. The heater wire includes a heater lead wire formed on the lead portion. The sensor is provided on the heater lead wire.

3 Claims, 8 Drawing Sheets

POWER STORAGE DEVICE

This nonprovisional application is based on Japanese Patent Application No. 2019-088234 filed on May 8, 2019 with the Japan Patent Office, the entire contents of which are hereby incorporated by reference.

BACKGROUND

Field

The present disclosure relates to power storage devices.

Description of the Background Art

A power storage device includes a plurality of power storage cells. Generally, the internal resistance in the power storage cell increases as the temperature of the power storage cell decreases. In view of this, a power storage device disclosed in Japanese Patent Laying-Open No. 2018-32548 is provided with a heater that increases the temperature of a power storage cell when the power storage cell has a low temperature.

Specifically, the power storage device disclosed in Japanese Patent Laying-Open No. 2018-32548 includes a plurality of power storage cells, a heater disposed on the lower surface side of the power storage cells, and an elastic member that presses the heater against the power storage cells.

The heater includes a nonwoven fabric and a heater wire sewn on the nonwoven fabric, and when a current passes through the heater wire, the temperature of the heater wire increases.

SUMMARY

In the power storage device disclosed in Japanese Patent Laying-Open No. 2018-32548, the heater wire may break due to aged deterioration or the like.

It is thus conceivable that, for example, a sensor such as a thermistor will be attached to the heater wire. If the heater wire is broken during driving of the heater, no current passes through the heater wire, and accordingly, the temperature of the heater wire does not increase. Thus, a break of the heater wire can be detected based on a value output from the sensor. On the other hand, the heater is pressed against the power storage cells with an insulating member therebetween. Thus, when the sensor is attached to the heater wire, the sensor is disposed between the heater and the power storage cells.

Even when the heater wire is broken, for example, as the temperature of the power storage cells increases through charging of the power storage cells, the sensor is heated by the heat of the power storage cells. This may lead to a fear that the presence or absence of a break of the heater wire may be mistakenly determined when the presence or absence of a break of the heater wire is determined based on a signal from the sensor.

The present disclosure has been made in view of the above problem, and an object thereof is to provide a power storage device capable of successfully determining the presence or absence of a break of a heater wire.

A power storage device according to the present disclosure includes at least one power storage cell, a heater that increases a temperature of the at least one power storage cell, a pressing member that presses the heater against the at least one power storage cell, and a sensor provided in the heater. The heater includes a base material and a heater wire provided on the base material. The base material includes a lead portion drawn from between the pressing member and the at least one power storage cell. The heater wire includes a heater lead wire formed on the lead portion. The sensor is provided on the heater lead wire.

In the power storage device, the sensor is provided at a position apart from the pressing member and the power storage cell. In measurement of the temperature of heater lead wire, thus, the sensor can be restrained from being thermally affected by the power storage cell and can accurately measure the temperature of the heater wire. This facilitates the determination of the presence or absence of a break of the heater wire.

The lead portion is formed to surround the sensor. The power storage device can restrain the sensor from directly contacting an external member, thus reducing damage to the sensor.

The power storage device further includes a housing case that houses the at least one power storage cell, the pressing member, the heater, and the sensor, and a controller that controls driving of the heater and the sensor. The controller obtains a signal from the sensor as information indicating a temperature in the housing case when driving of the heater is stopped.

In the power storage device, the sensor measures the temperature in the housing case when the heater is not driven. At this time, the sensor is apart from the power storage cell and is less thermally affected by the power storage cell, and thus, can accurately measure the temperature in the housing case.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
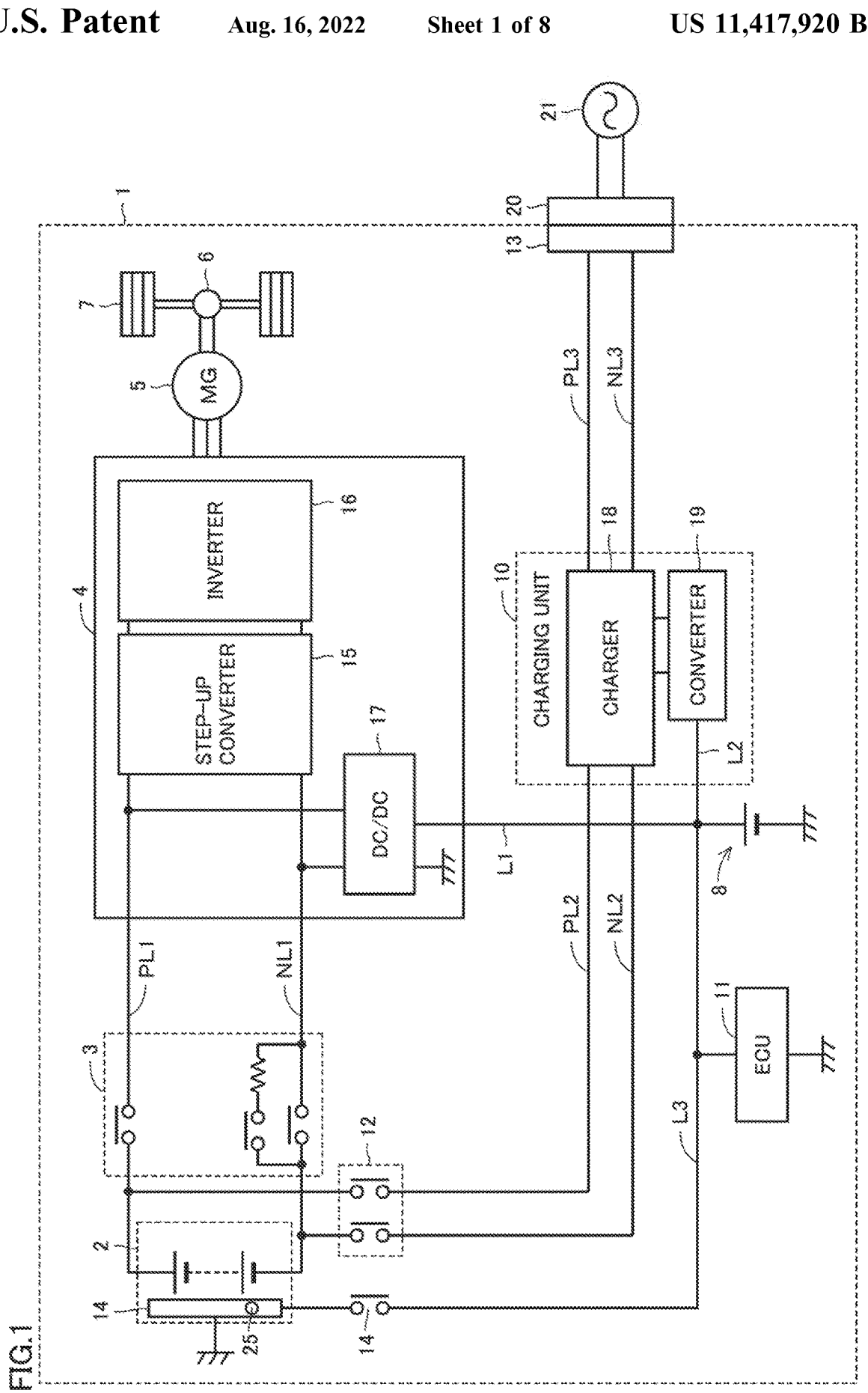
FIG. 1 is a general block diagram showing a vehicle 1 on which a power storage device according to the present embodiment is mounted.

A power storage device according to the present embodiment will be described with reference to FIGS. 1 to 9. Among the components shown in FIGS. 1 to 9, the same or substantially the same components will be designated by the same reference characters, and the description thereof will not be repeated. Among the components described in the embodiment, the components corresponding to those recited in the claims may be described in the embodiment together with parenthesized names of the components recited in the claims.

FIG. 1 is a general block diagram showing a vehicle 1 on which a power storage device according to the present embodiment is mounted. Vehicle 1 includes a power storage device 2, a system main relay (SMR) 3, a power control unit (PCU) 4, a rotating electric machine 5, a power transmission gear 6, driving wheels 7, an auxiliary battery 8, a battery heater 9, a charging unit 10, an ECU 11, a charging relay 12, a charging inlet 13, and a sensor 25.

Power storage device 2 is, for example, a lithium-ion battery, a nickel-hydrogen battery, a capacitor, or the like, and is a direct-current (DC) power supply.

SMR 3 is connected to power storage device 2, and PCU 4 is connected to SMR 3 by a positive electrode line PL1 and a negative electrode line NL1.

PCU 4 includes a step-up converter 15, an inverter 16, and a sub-DCDC converter 17. Step-up converter 15 is connected to inverter 16, and inverter 16 is connected to rotating electric machine 5.

Charging relay 12 is connected between power storage device 2 and SMR 3. Charging unit 10 is connected with a positive electrode line PL2 and a negative electrode line NL2, and positive electrode line PL2 and negative electrode line NL2 are connected to charging relay 12.

Charging unit 10 includes a charger 18 and a converter 19. Charger 18 is connected to positive electrode line PL2 and negative electrode line NL2 and is further connected to charging inlet 13 through a positive electrode line PL3 and a negative electrode line NL3. Converter 19 is connected between auxiliary battery 8 and charger 18. ECU 11 and battery heater 9 are also connected to converter 19 and auxiliary battery 8.

In traveling of vehicle 1 described above, ECU 11 turns off charging relay 12 and turns on SMR 3. ECU 11 then drives step-up converter 15 and inverter 16 to convert DC power from power storage device 2 into alternating-current (AC) power and supplies the AC power to rotating electric machine 5. Rotating electric machine 5 is driven by the supplied AC power. A driving force from rotating electric machine 5 is transmitted to driving wheels 7 through power transmission gear 6.

Sub-DCDC converter 17 is connected to positive electrode line PL1 and negative electrode line NL1 and is connected between SMR 3 and step-up converter 15. Sub-DCDC converter 17 is connected to auxiliary battery 8, ECU 11, battery heater 9, and the like through power line L1. A relay 14 is provided between battery heater 9 and auxiliary battery 8.

In charging of auxiliary battery 8, ECU 11 drives sub-DCDC converter 17. Thus, the voltage of DC power supplied from power storage device 2 to sub-DCDC converter 17 is adjusted and supplied to auxiliary battery 8.

In charging of power storage device 2, a charging plug 20 is connected to charging inlet 13. ECU 11 turns off SMR 3 and turns on charging relay 12. AC power is then supplied from charging plug 20 to charger 18. Charger 18 then converts the AC power into DC power, and the DC power is supplied to power storage device 2.

In charging of power storage device 2 with the electric power from charging plug 20, ECU 11 drives battery heater 9 in order to increase the temperature of power storage device 2. Specifically, ECU 11 turns on relay 14 to supply the electric power from auxiliary battery 8 to battery heater 9. When power storage device 2 has a low temperature, the internal resistance of power storage device 2 increases, so that power storage device 2 is charged less easily. In charging of power storage device 2, ECU 11 supplies the electric power to battery heater 9 to increase the temperature of power storage device 2. Note that battery heater 9 is not driven except for when power storage device 2 is charged with the electric power from charging plug 20.

Sensor 25 measures the temperature of battery heater 9 and transmits the result of the measurement to ECU 11. ECU 11 determines whether battery heater 9 is driven normally based on a value output from sensor 25.

The configurations of power storage device 2, battery heater 9, and the like will now be described in detail.

Figure 2:
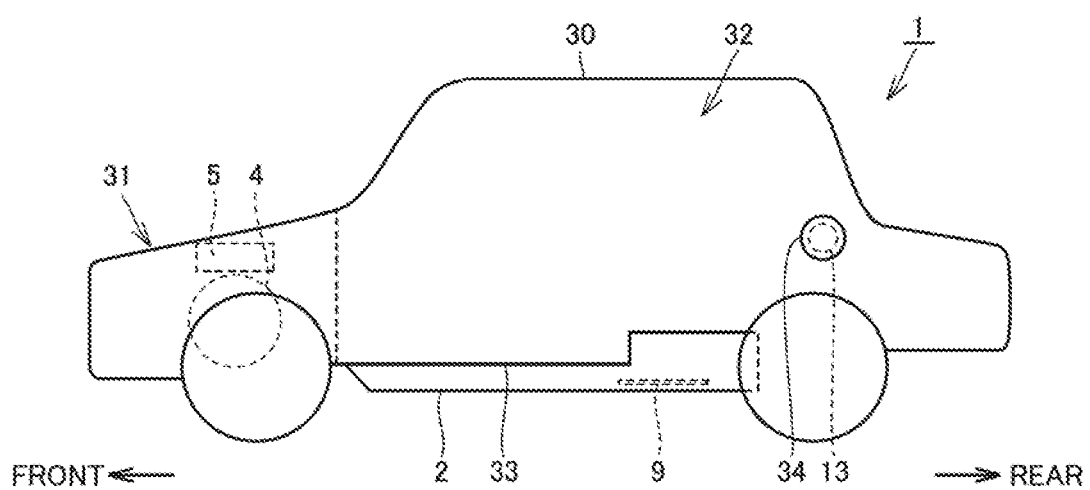
FIG. 2 schematically shows vehicle 1.

FIG. 2 schematically shows vehicle 1. Vehicle 1 includes a vehicle main body 30. In vehicle main body 30, an engine compartment 31 and a vehicle interior 32 are formed. PCU 4 and rotating electric machine 5 are housed in engine compartment 31.

Vehicle main body 30 includes a floor panel 33. Floor panel 33 is a metal plate-shaped member forming the bottom surface of vehicle 1.

Power storage device 2 is provided on the lower surface of floor panel 33. Charging inlet 13 is provided on the lateral surface of vehicle main body 30. A lid 34 is provided on the lateral surface of vehicle main body 30. When lid 34 is opened, charging inlet 13 is exposed to the outside.

Figure 3:
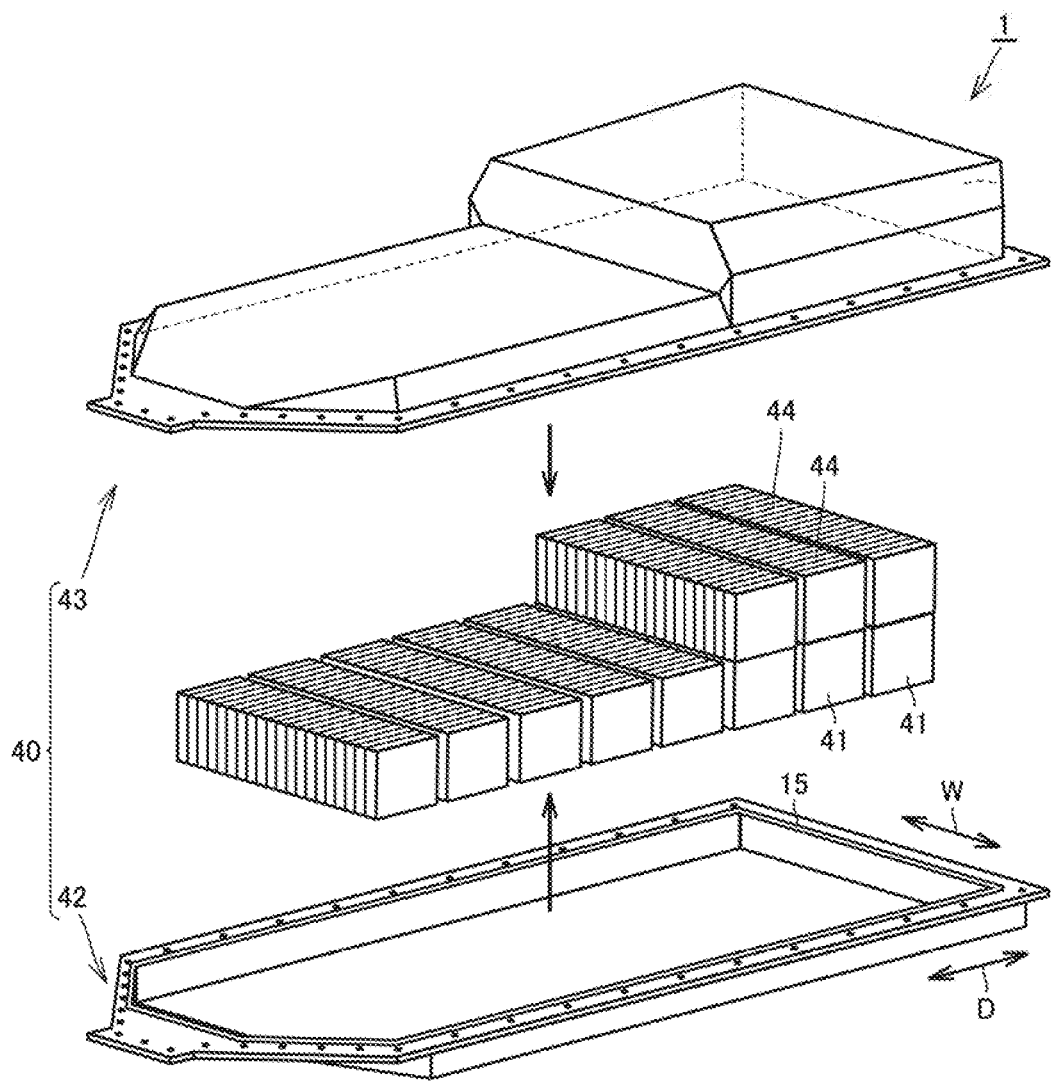
FIG. 3 is an exploded perspective view of a power storage device 2.

FIG. 3 is an exploded perspective view of power storage device 2. Power storage device 2 includes a housing case 40 and a plurality of power storage modules 41.

Housing case 40 includes an under cover 42 and an upper cover 43. Housing case 40 is made of metal material, resin, or the like. Power storage modules 41 are housed in housing case 40.

Figure 4:
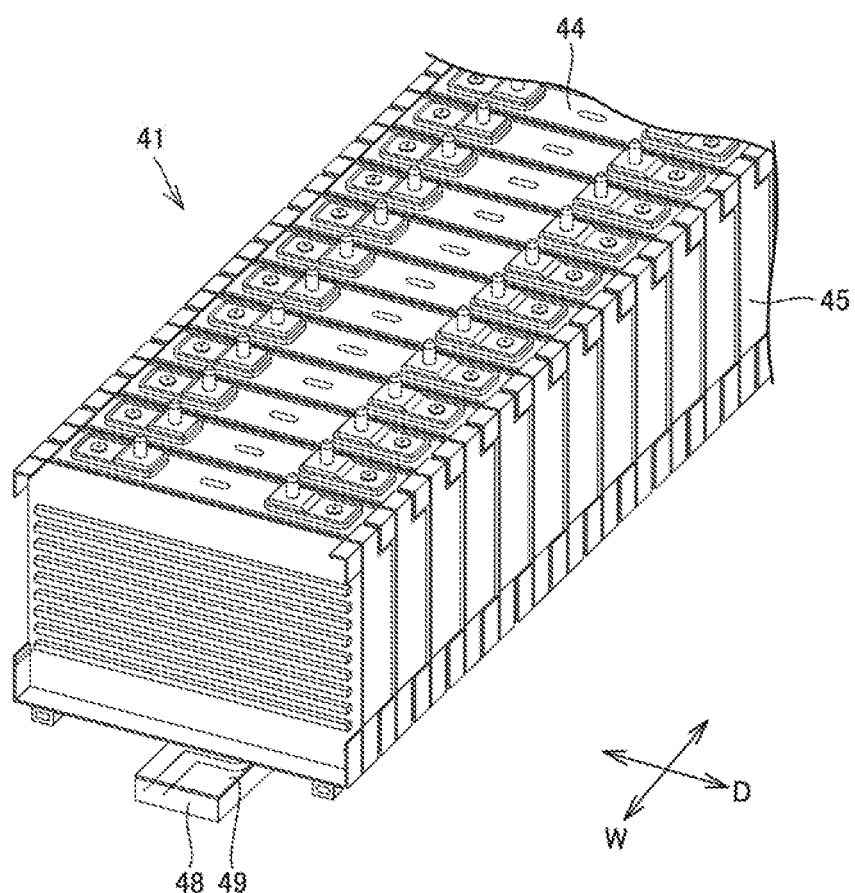
FIG. 4 is a perspective view of part of a power storage module 41.

FIG. 4 is a perspective view of part of power storage module 41. Power storage module 41 is formed to be elongated in vehicle width direction W, and a heater 48 and a pressing member 49 are disposed on the lower surface side of power storage module 41.

Figure 5:
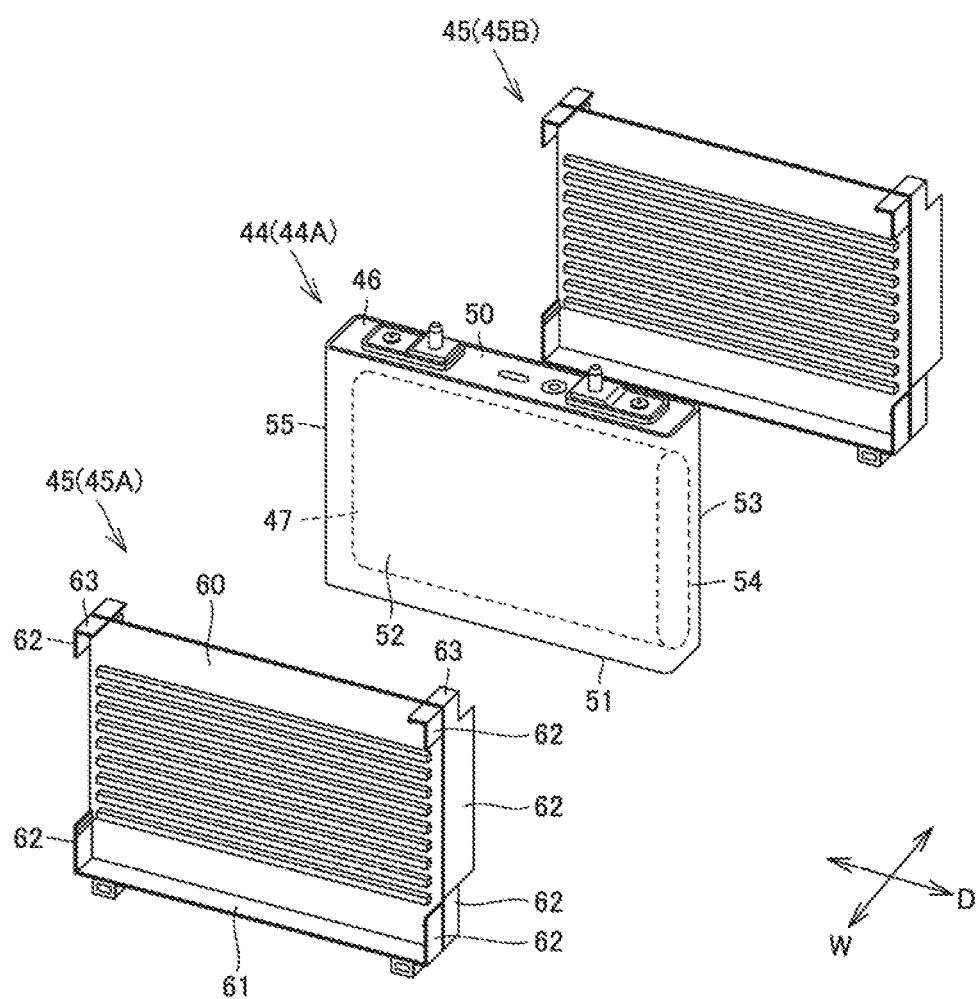
FIG. 5 is an exploded perspective view of power storage module 41.

FIG. 5 is an exploded perspective view of power storage module 41. Power storage module 41 includes a plurality of power storage cells 44 and a plurality of resin members 45.

Power storage cell 44 includes a case 46 and an electrode body 47. Case 46 is formed of a metal material, such as aluminum, and electrode body 47 and an electrolytic solution are housed in case 46.

Case 46 is shaped into a rectangular parallelepiped which is thinner in vehicle width direction W. Case 46 includes an upper surface 50, a lower surface 51, main surfaces 52 and 53, and lateral surfaces 54 and 55. Main surface 52 and main surface 53 are arranged in vehicle width direction W, and lateral surface 54 and lateral surface 55 are arranged in a front-rear direction D.

Resin member 45 is disposed between power storage cells 44. When attention is focused on a power storage cell 44A, a resin member 45A is disposed on the main surface 52 side of power storage cell 44A, and a resin member 45B is disposed on the main surface 53 side of power storage cell 44A. Note that resin member 45A and resin member 45B have substantially the same configuration.

Resin member 45A, 45B includes a main plate 60, a bottom plate 61, a plurality of lateral plates 62, and a plurality of top plates 63. Main plate 60 is disposed on main surface 52. Bottom plate 61 is formed at a lower side of main plate 60, and bottom plate 61 is formed on lower surface 51. Lateral plates 62 are disposed on lateral surfaces 54 and 55, and top plates 63 are disposed on upper surface 50.

As resin member 45A and resin member 45B are attached to power storage cell 44, lower surface 51, main surfaces 52 and 53, and lateral surfaces 54 and 55 of power storage cell 44 are covered by resin members 45A and 45B.

Figure 6:
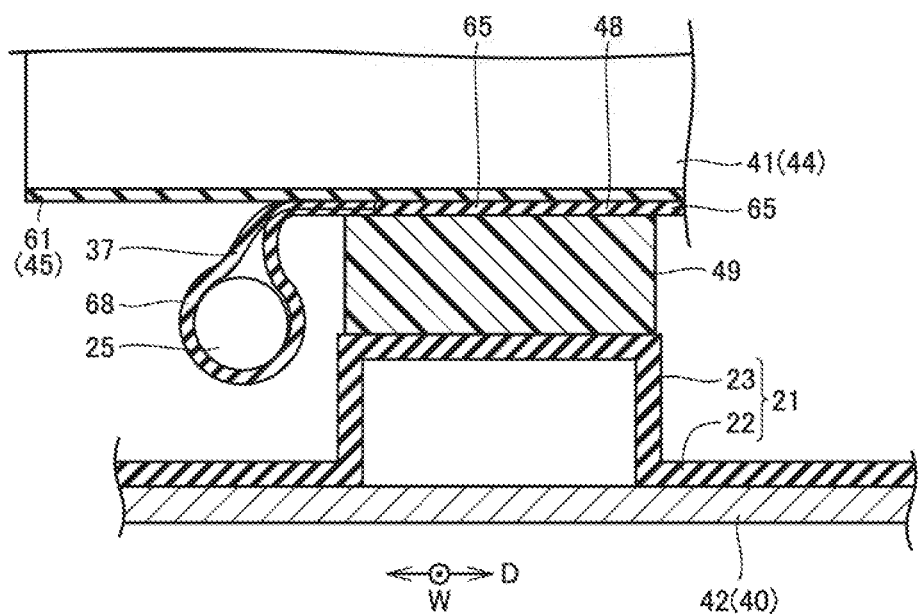
FIG. 6 shows cross-sections of a heater 48 and a pressing member 49, and components therearound.

FIG. 6 shows cross-sections of heater 48 and pressing member 49, and components therearound. FIG. 6 shows cross-sections perpendicular to vehicle width direction W.

A base member 21 formed of resin or the like is disposed on the upper surface of under cover 42. Base member 21 includes a base plate 22 and a projection 23. Base plate 22 is a plate-shaped member disposed on the upper surface of under cover 42, and projection 23 is formed to project upward from base plate 22. Pressing member 49 is disposed on the upper surface of projection 23, and pressing member 49 is formed of, for example, an elastic member, such as resin or sponge. Pressing member 49 presses heater 48 toward the lower surface of power storage module 41. Specifically, heater 48 is pressed against bottom plate 61 of resin member 45.

Figure 7:
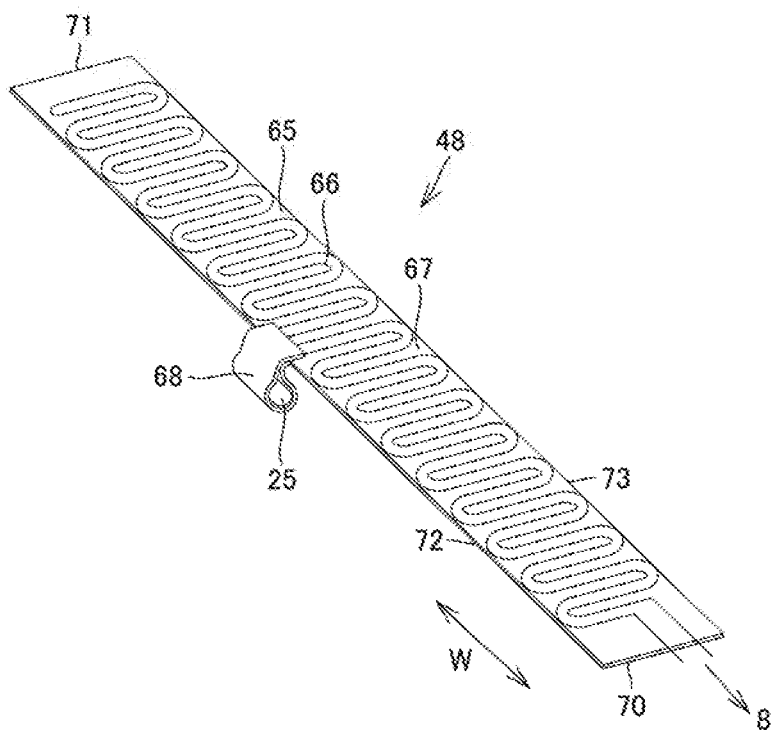
FIG. 7 is a schematic perspective view of heater 48.

FIG. 7 is a schematic perspective view of heater 48. Heater 48 includes a base material 65 and a heater wire 66.

Base material 65 is formed to be elongated in vehicle width direction W, and base material 65 is formed of, for example, nonwoven fabric or the like. Heater wire 66 is formed on the upper surface of base material 65, and for example, heater wire 66 is sewn on the upper surface of base material 65. Heater wire 66 is formed from one end to the other end of base material 65 in vehicle width direction W. Heater wire 66 is connected to auxiliary battery 8.

Base material 65 includes a main body portion 67 and a wound portion 68. Main body portion 67 is formed to be elongated in vehicle width direction W. Main body portion 67 includes end sides 70 and 71 and long sides 72 and 73. End sides 70 and 71 are located at the ends in vehicle width direction W, and long sides 72 and 73 extend to connect end surface 70 and end surface 71.

Wound portion 68 is formed at long side 72. For example, wound portion 68 is formed at the center of long side 72.

Figure 8:
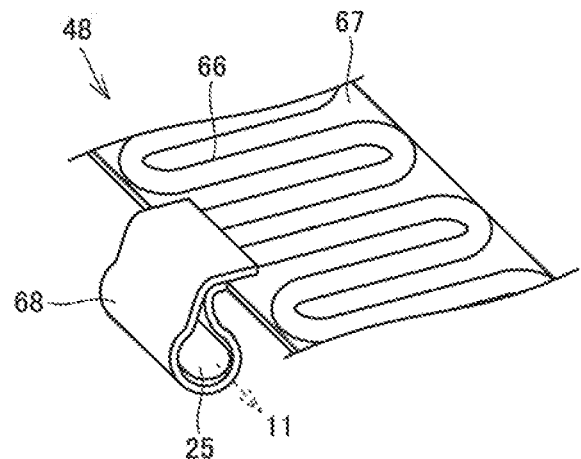
FIG. 8 is a perspective view of a wound portion 68.
Figure 9:
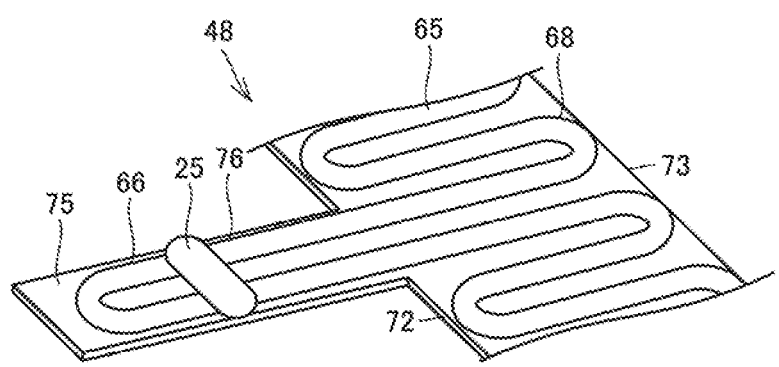
FIG. 9 is a perspective view of wound portion 68 which is developed.

FIG. 8 is a perspective view of wound portion 68, and FIG. 9 is a perspective view of wound portion 68 which is developed.

Referring to FIG. 9, base material 65 includes main body portion 67 and a lead portion 75, and lead portion 75 is formed to extend from the center of long side 72. Heater wire 66 is also formed on the upper surface of lead portion 75. In other words, heater wire 66 includes a heater lead wire 76 located on the upper surface of lead portion 75. Sensor 25 is provided on the upper surface of lead portion 75, and sensor 25 is glued or sewn.

Wound portion 68 is formed by sewing the leading edge side of lead portion 75 on the upper surface of lead portion 75, and wound portion 68 is shaped into a tube. The upper surface of lead portion 75 is the inner surface of wound portion 68, and heater lead wire 76 is disposed on the inner circumferential surface of wound portion 68. Wound portion 68 is formed to surround sensor 25, and the inner circumferential surface of wound portion 68 is in contact with the outer circumferential surface of sensor 25. Heater lead wire 76 is formed on the inner circumferential surface of wound portion 68, and sensor 25 is in contact with heater wire 66.

During driving of battery heater 9, ECU 11 calculates a temperature of battery heater 9 based on a value output from sensor 25. When ECU 11 determines that the calculated temperature is lower than a prescribed temperature, ECU 11 determines that battery heater 9 is faulty. For example, the value output from sensor 25 is small when heater wire 66 is broken, and thus, ECU 11 can detect a fault of battery heater 9.

Sensor 25 is driven also when battery heater 9 is not driven. Sensor 25 measures the ambient temperature and transmits the result of the measurement to ECU 11. ECU 11 obtains the temperature in power storage device 2 based on the value output from sensor 25. For example, ECU 11 uses the temperature in power storage device 2 in calculation of the SOC of power storage device 2.

Referring to FIG. 6, main body portion 67 of base material 65 is retained between the lower surface of power storage module 41 and pressing member 49.

Wound portion 68 is drawn from between the lower surface of power storage module 41 and pressing member 49. Wound portion 68 and sensor 25 are thus provided at a position apart from power storage module 41.

In charging of power storage device 2 with the electric power from charging plug 20, electric power is supplied to heater wire 66. Heater wire 66 is located on the inner circumferential surface of wound portion 68, and sensor 25 measures the temperature of heater wire 66.

On this occasion, sensor 25 is provided at the position apart from power storage module 41. In measurement of the temperature of heater wire 66, accordingly, sensor 25 is restrained from being thermally affected by power storage module 41, thus accurately measuring the temperature of heater wire 66. This facilitates detection of a break of heater wire 66 or the like.

Also when heater 48 is not driven and no current passes through heater wire 66, sensor 25 is driven. Specifically, sensor 25 measures the ambient temperature in power storage device 2 and transmits the measured temperature to ECU 11.

On this occasion, sensor 25 and wound portion 68 are located apart from their surrounding members, such as power storage module 41 and base member 21. In measurement of the ambient temperature in power storage device 2, thus, sensor 25 and wound portion 68 are restrained from being thermally affected by the surrounding members, leading to accurate measurement of the ambient temperature in power storage device 2.

ECU 11 estimates the SOC of power storage cell 44 based on information including the ambient temperature in power storage device 2 and the temperature of power storage cell 44 obtained separately. Sensor 25 can accurately measure the ambient temperature in power storage device 2, leading to improved estimate accuracy of the SOC of power storage cell 44.

The circumferential surface of sensor 25 is covered by wound portion 68. Even when power storage device 2 is vibrated by traveling of vehicle 1, thus, sensor 25 can be restrained from directly contacting its surrounding member, thus reducing damage to sensor 25.

When vehicle 1 is a hybrid vehicle, an exhaust pipe may be disposed near the lateral surface of housing case 40. In such a case, exhaust may flow through the exhaust pipe to increase the temperature of the exhaust pipe, and accordingly, the lateral surface of housing case 40 may locally have a high temperature.

Wound portion 68 is provided at the center of main body portion 67 in vehicle width direction W and is provided at the center of power storage device 2 in vehicle width direction W. Even when the lateral surface of housing case 40 locally has a high temperature, thus, wound portion 68 is restrained from being thermally affected directly by the locally-high-temperature portion. In other words, sensor 25 can measure an average temperature in housing case 40.

In the embodiment above, lead portion 75, to which sensor 25 is attached, is wound to form wound portion 68, and wound portion 68 is lead portion 75. In other words, wound portion 68 is merely one form of lead portion 75, and lead portion 75 may not be wound, and sensor 25 may be attached to lead portion 75 which is not wound.

Also in this case, sensor 25 is apart from power storage module 41 and base member 21. In measurement of the temperature of heater lead wire 76 and the temperature in housing case 40, sensor 25 can be restrained from being thermally affected directly by an external member, such as power storage module 41.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power storage device comprising:
    at least one power storage cell;
    a heater that increases a temperature of the at least one power storage cell;
    a pressing member that presses the heater against the at least one power storage cell; and
    a sensor provided in the heater, wherein
    the heater includes a base material and a heater wire provided on the base material,
    the base material includes a lead portion drawn from between the pressing member and the at least one power storage cell,
    the heater wire includes a heater lead wire formed on the lead portion, and
    the sensor is provided on the heater lead wire.

2. The power storage device according to claim 1, wherein the lead portion is formed to surround the sensor.

3. The power storage device according to claim 1, further comprising:
    a housing case that houses the at least one power storage cell, the pressing member, the heater, and the sensor; and
    a controller that controls driving of the heater and the sensor,
    wherein the controller obtains a signal from the sensor as information indicating a temperature in the housing case when driving of the heater is stopped.

\* \* \* \* \*